Sept. 10, 1935.  H. M. PATCH  2,014,360
RESILIENT WHEEL
Filed Dec. 2, 1930   4 Sheets-Sheet 1

WITNESSES
A B Wallace
W. D. O'Connor

INVENTOR
Harry M. Patch
by Brown & Critchlow
his attorneys

Sept. 10, 1935.    H. M. PATCH    2,014,360
RESILIENT WHEEL
Filed Dec. 2, 1930    4 Sheets-Sheet 2
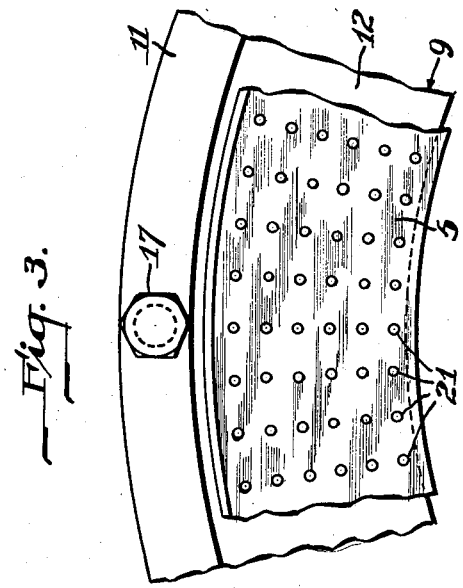
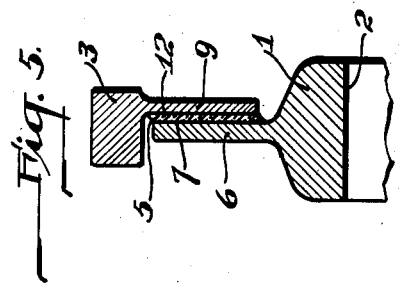
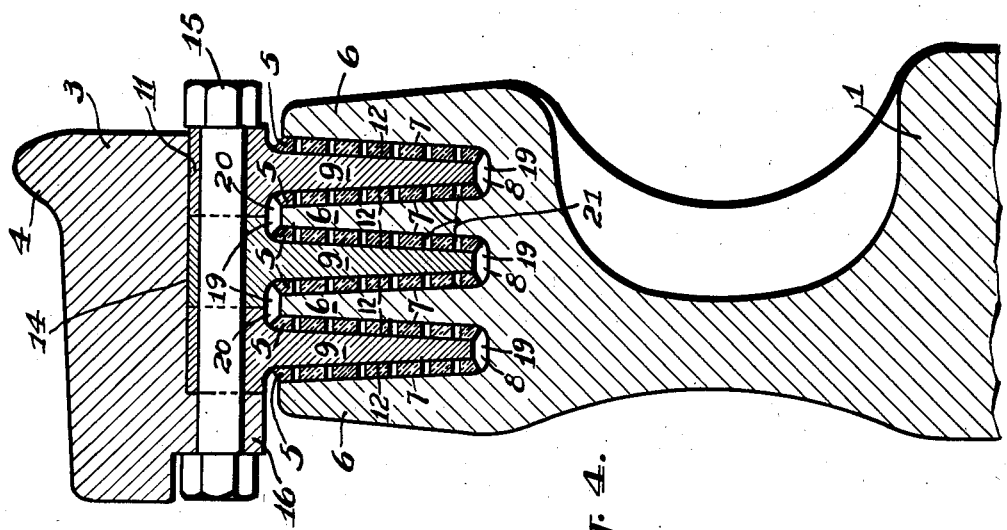
WITNESSES
INVENTOR
Harry M. Patch
by Brown & Critchlow
his attorneys Sept. 10, 1935.  H. M. PATCH  2,014,360
RESILIENT WHEEL
Filed Dec. 2, 1930  4 Sheets-Sheet 3
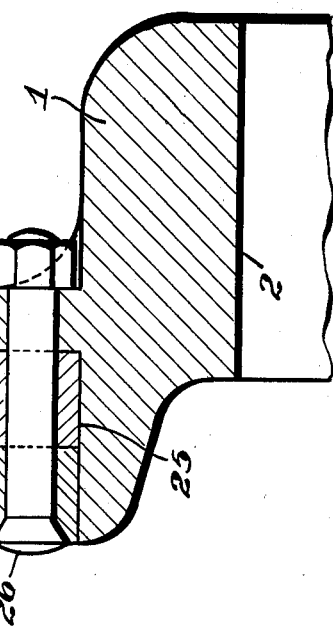
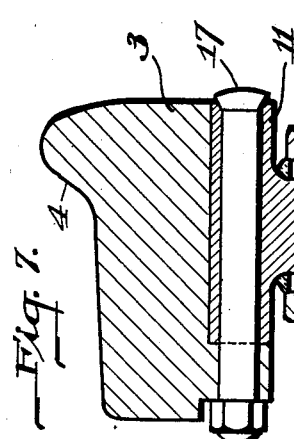
Fig. 7.
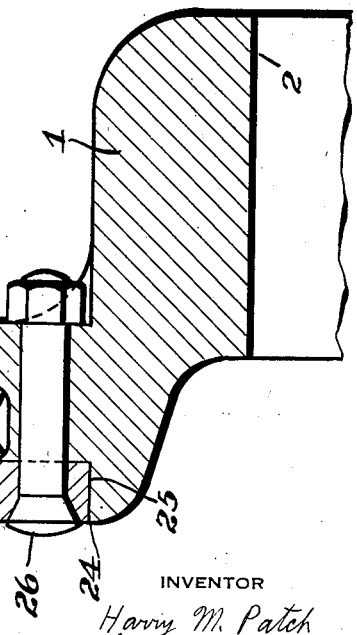
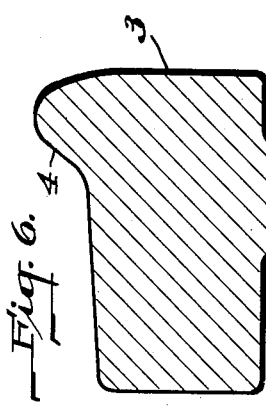
Fig. 6.
WITNESSES
A. B. Wallace
W. D. O'Connor
INVENTOR
Harry M. Patch
by Brown & Critchlow
his attorneys

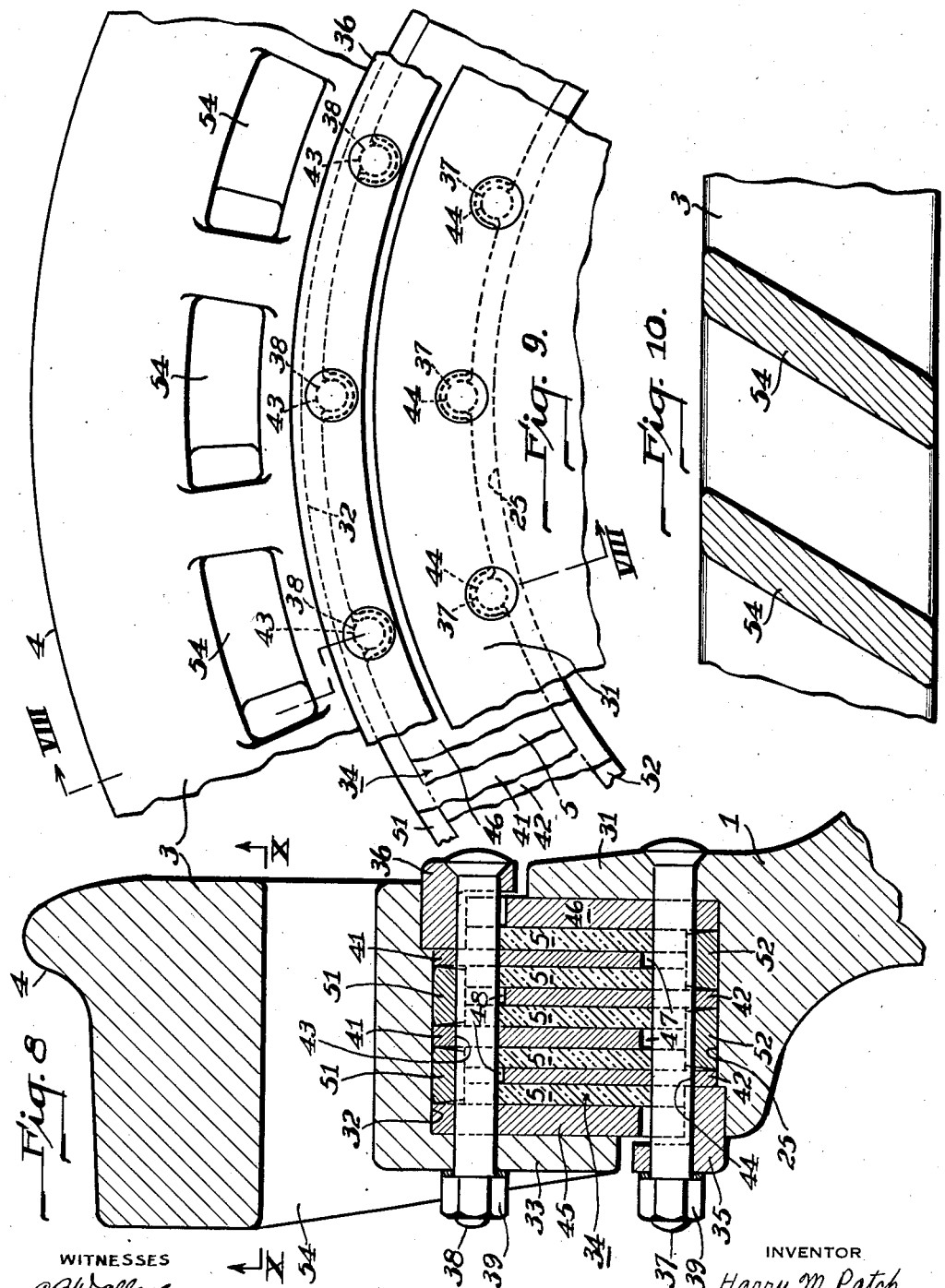

Patented Sept. 10, 1935

2,014,360

UNITED STATES PATENT OFFICE 2,014,360

RESILIENT WHEEL

Harry M. Patch, Seattle, Wash., assignor, by mesne assignments, to Wingfoot Corporation, Wilmington, Del., a corporation of Delaware Application December 2, 1930, Serial No. 499,489

7 Claims. (Cl. 295—11)

This invention relates generally to vehicle wheels and particularly to resilient wheels for use on railway and other vehicles.

Prior to my invention many attempts have been made to construct satisfactory resilient wheels for railway vehicles by interposing resilient material between the wheel hub and the wheel rim. However, such resilient wheels have not been satisfactory for the reason that the stresses carried by the resilient material were so high that the material quickly depreciated or failed altogether. The large stresses in the resilient material in prior wheels resulted from two separate conditions in the wheel structure. First, the wheels have been so designed that the total amount of resilient material in them was not sufficient to safely carry the loads to which the wheel might be subjected. Further, most of the wheels have been so designed that only a small portion of the total amount of resilient material in the wheel was deflected at any one time, and consequently this small amount of material was called upon to transmit all of the force between the hub and rim of the wheel. As a result, the unit stresses set up within the resilient material were very much in excess of the safe working stresses of the material.

It is, therefore, an object of my invention to provide a resilient wheel for railway and other vehicles which includes sufficient resilient material to transmit safely the forces to which the wheel may be subjected in normal operation.

A more general object of the invention is to provide a resilient wheel for railway vehicles that is substantially noiseless in operation and that is adapted to operate for long periods of time without material depreciation.

A further object of my invention is to provide a resilient wheel in which the resilient material is so disposed that all of it is subjected to substantially uniform stress when torque or radial forces are transmitted from the hub to the rim of the wheel.

In accordance with the present invention, rubber plates are disposed between a metallic rim member and its supporting hub in substantially the plane of rotation of the wheel. The plates are vulcanized at one side to the hub portion and at the other side to the rim portion in such manner that radial and torque forces may be applied to the plates through the vulcanized joints in shear, and substantially uniform shear and bending stresses will thus be set up throughout all parts of the resilient plates. In this manner all of the resilient material is utilized to transmit torque and radial forces, and the stresses within the resilient material are equally distributed throughout its entire volume.

The foregoing and other objects of the invention will become more apparent as a better understanding of the principles involved is had upon studying the specific embodiments of the invention which are described in the following specification and illustrated in the accompanying drawings, in which:

Fig. 3 is an enlarged view in side elevation of a fragment of the wheel felly and resilient plate;

Fig. 4 is a view in section of a portion of the wheel shown in Fig. 1 taken on the plane represented by the line IV—IV;

Fig. 5 is a view in cross section of a portion of a resilient wheel embodying a simplified modification of my invention;

Fig. 6 is a view in cross section of a portion of a resilient wheel embodying another modification of my invention;

Fig. 7 is a view similar to Fig. 6 showing a further modification of the invention;

Fig. 8 is a view in cross section of a preferred embodiment of my invention taken on the plane represented by the line VIII—VIII in Fig. 9;

Fig. 9 is a view in side elevation on a reduced scale of a portion of the wheel shown in Fig. 8 with some parts broken away to show the construction of the resilient element; and Fig. 10 is a view in section showing the spokes of the wheel taken on the plane represented by the line X—X in Fig. 8.

Figure 1:
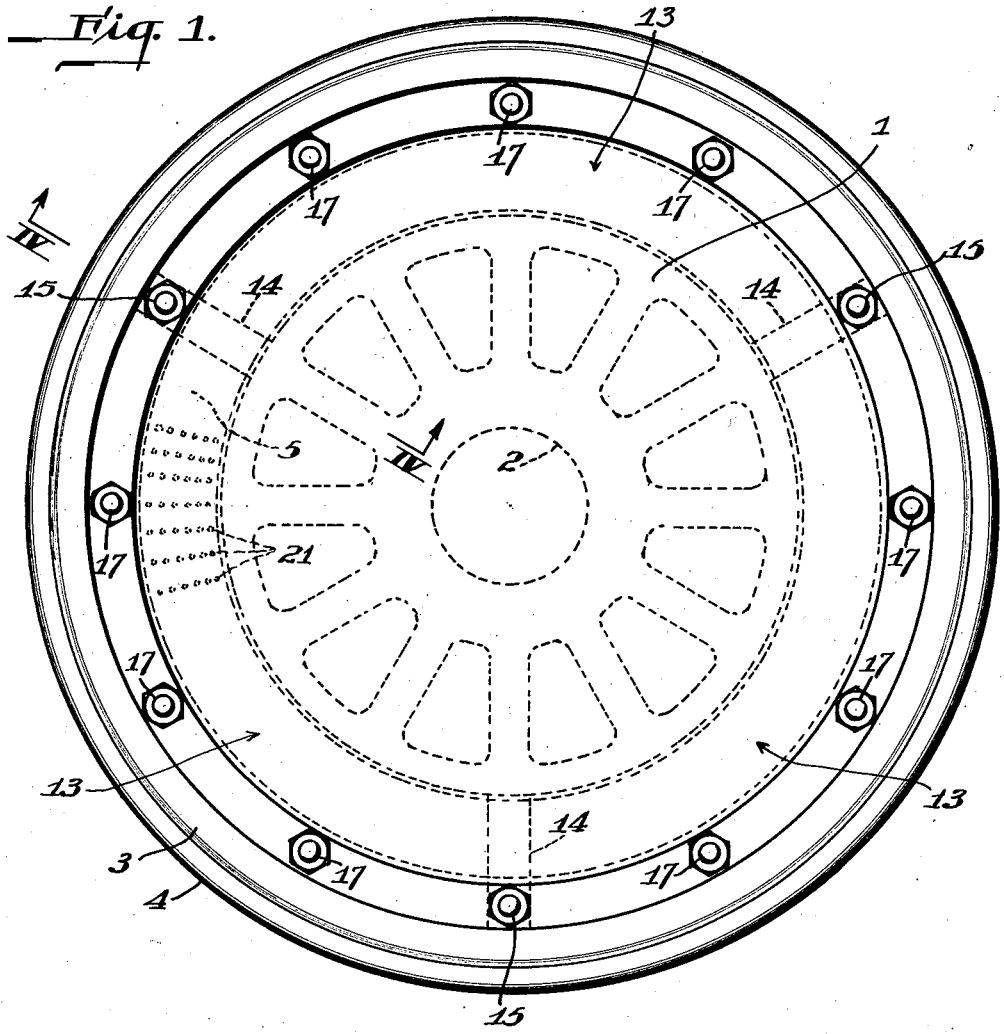
Fig. 1 is a view in side elevation of a railway vehicle wheel embodying my invention.

Referring more particularly to the drawings, Figs. 1 to 4 show a resilient wheel that constitutes one embodiment of my invention, comprising a central member or hub 1 having an internal bore 2 for receiving an axle shaft (not shown) which may be used for mounting the wheel in a railway vehicle. Carried by the hub 1 is a concentrically disposed rim member 3 having a standard tread and flange portion 4 for engaging a rail or other surface upon which the wheel may be operated. In accordance with this invention the connecting element between the hub 1 and the rim 3 comprises a plurality of plates 5 of resilient material such as live rubber.

As best shown in Fig. 4, the hub member 1 is provided with a plurality of outwardly extending annular webs 6 that extend radially from the axis of rotation of the wheel and are provided with plain faces 7. The faces 7 on adjacent webs 6 are disposed at an angle, to provide greater thickness at the bases than at the peripheries thereof, in such manner that the spaces 8 between the webs 6 are slightly tapered or wedge shaped from their outer to their inner ends.

Within the grooves 8 in the center member 1 are disposed inwardly extending annular webs 9 that are of shape complementary to the shapes of the grooves 8 but of somewhat smaller dimensions. The inwardly extending webs 9 may be joined integrally to the rim or they may constitute part of a wheel felly 11 upon which the rim 3 is mounted. The inwardly extending webs 9 are likewise provided at each side with a plain face 12 that is disposed parallel to, and spaced from, the adjacent plain face 7 on the outwardly extending webs 6.

As shown, the rubber plates 5 that constitute the connection between the hub 1 and the rim 3 are disposed in the spaces between the plain faces 7 and 12 of the web members 6 and 9 respectively. As may be seen in Fig. 1, each of the rubber plates 5 has the shape of an annulus disposed concentrically with the hub 1 and substantially in the plane of rotation of the wheel.

In order that torque and radial forces may be equally distributed throughout all parts of the rubber plates 5, it is necessary that the plates 5 be securely fastened to the plain faces 7 and 12 in such manner that shear stresses may be transmitted from the webs 6 and 9 to them. To obtain a strong shear resisting joint between the webs 6 and 9 and the rubber plates 5 it has been found desirable to adhesively secure them as by vulcanizing the rubber to the plain surfaces of the webs in accordance with a known vulcanizing process. In forming a joint in accordance with this process the surfaces 7 and 12 may be roughened and raw rubber pressed between them and vulcanized, or a suitable cement may be applied to the surfaces of preformed rubber plates 5 before they are placed in position between the web members. To avoid rubbing the cement off of the surfaces of the plates 5 during the assembling process, the grooves 8 in the wheel center 1 have been made slightly tapering as hereinbefore explained.

Figure 2:
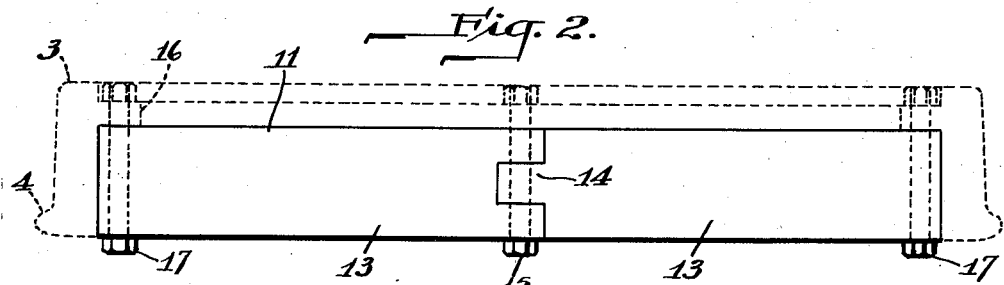
Fig. 2 is a view in end elevation of the wheel shown in Fig. 1 with the rim removed to show the construction of the wheel felly.

In assembling the resilient wheel, the plates 5, which may be cut in segments of any convenient size, are coated with cement and placed within the grooves 8, adjacent to each other to constitute a continuous annulus, or suitably spaced apart as may be desired, in such manner that one side of each plate is in contact with the face 7 of one of the webs 6. As shown in Figs. 1 and 2 the felly member 11 is preferably made in three segments 13 in order that each segment may be applied to the hub 1 separately by inserting the webs 9 between the rubber plates 5 in the grooves 8. By reason of the fact that the webs 9 are tapered and because each segment 13 of the felly 11 is quite short, the webs 9 may be moved nearly to their final positions before they engage the cement on the surface of the plates 5. In this manner the plates 5 and the felly 11 may be assembled on the hub 1 with the proper amount of vulcanizing cement disposed in the joints between the plates and the faces 7 and 12 of the webs 6 and 9.

As shown in Figs. 2 and 4 the ends of the segments 13 are joined by suitable dovetail joints 14 to constitute the complete felly 11 and are secured by bolts 15 that pass through aligned holes in adjacent segments 13. The bolts 15 also extend through holes in an inwardly projecting flange 16 on the rim 3 for holding the rim securely on the felly 11. It may be readily seen that the rim 3 serves to press or bind the three segments 13 of the felly 11 tightly together. If it is desirable, other bolts 17 may be passed through the felly 11 and rim 3 at positions between the dovetailed joints 14.

After the wheel has been thus assembled the rubber plates 5 may be securely vulcanized to the webs 6 and 9 by the well-known process of vulcanizing rubber to metallic surfaces. As may be seen in Fig. 4, when in the assembled position, clearance spaces 19 of suitable width are provided between the ends of the webs 9 and the bottoms of the grooves 8 and also between the outer ends of the web 6 and the bottoms of grooves 20 between the webs 9 on the felly 11. By reason of the clearance spaces 19 it is apparent that when a radial load is applied to the wheel, as in the case the wheel is utilized to support a railway vehicle on a track, the rubber plates 5 will be stressed throughout their entire volume in a substantially vertical line and will deflect by stretching to permit the hub member 1 to move downwardly relative to the rim 3.

In the event that torque is transmitted from the hub 1 to the rim 3, as in case the wheel is applied to a driven axle of a street car or locomotive, it is clear that the rubber plates 5 will likewise be subjected to shear forces circumferentially of the wheel and will deflect by stretching to permit a slight angular displacement of the hub 1 relative to the rim 3. If angular or thrust forces are applied to the wheel, such as occur when the vehicle is operated on a curved track, the rubber plates 5 will be subjected to tension and compression stresses at various positions, but it is apparent that the stresses applied in this manner will not be sufficiently high to injure the rubber. To provide for deflection of the rubber under tension or compression forces and the bending and shear forces set up by torque or radial loads, the rubber plates 5 are perforated as shown in Figs. 3 and 4 in such manner that the rubber may flow or deflect by enlarging or by closing the perforations 21.

As seen in Fig. 4 unless the rubber plates 5 are deflected beyond their normal working range by an excessive load, there is no metal-to-metal transmission of force from the hub 1 to the rim 3. In the event that a wheel embodying my invention is utilized on an electrically driven vehicle in which one portion of the electric circuit is through the wheels and the rails it will be necessary to provide an electrical conducting or bridging member from the hub to the rim which may be a copper cable (not shown) or other suitable flexible conducting member well known in the art. By reason of the interlocking relation of the webs 6 and 9 on the hub and rim respectively it is obvious that should failure of the rubber plates 5 occur it will be impossible for the rim 3 to come off and to cause derailment of the vehicle.

In Fig. 5 is shown a simplified modification of my invention illustrating the manner in which it may be applied to wheels other than wheels for railway vehicles. The resilient wheel here shown is provided with a plain rim 3 that may be taken to represent a belt pulley, gear wheel or a road wheel of a light vehicle. Integrally with the rim 3 is formed an inwardly extending annular web 9 having a plain face 12 disposed in the plane of rotation of the wheel. Likewise the hub 1 is provided with a single outwardly extending web 6 having a plain face 7 disposed adjacent to and parallel with the face 12 of the web 9. The resilient connecting means in this case comprises a single solid plate 5 of rubber disposed between the faces 12 and 7 of the webs 9 and 6 respectively and having its surface of greatest area in the plane of rotation of the wheel. The rubber plate and the webs may be adhesively joined by cementing or vulcanizing them together or by joining them in any other suitable manner.

In the elementary structure here shown it is apparent that when radial or torque forces are transmitted between the hub and the rim, shear stresses will be set up in the joints between the webs and the rubber plate. These stresses will be transmitted by the rubber, which will deform by stretching in the manner peculiar to materials of its class. In this modification the rubber plate 5 is not provided with relief holes such as are shown in Fig. 3 but is shown as a solid ring. It has been found that in some instances it is preferable to use a solid plate of rubber, and particularly when rubber having certain characteristics is used plates without relief holes will deflect satisfactorily.

It is further apparent that by changing the thickness or other dimensions of the plate 5 and by selecting rubber having other qualities and characteristics, the operating characteristics of the resilient wheel may be regulated to conform to any given condition of operation.

In the modification of my invention, shown in Fig. 6, the wheel rim 3 is provided with an integrally formed inwardly extending annular web 9 and the wheel center 1 is likewise provided with an integral outwardly extending annular web 6 disposed adjacent to the web 9 and separated therefrom by a rubber plate 5 which may be of annular shape. At the other side of the web 9 there is disposed a second annular rubber plate 5 which is clamped in position by a removable annular web member 23 that is carried by the hub 1. A wheel of this type may be assembled by first placing the right rubber plate 5, as seen in Fig. 6, adjacent the integral web 6 on the hub 1, then placing the rim 3 with its integral web 9 in contact with the plate 5. The second rubber plate 5 may then be placed in position at the other side of the web 9 and the structure clamped together by placing the removable web 23 on the hub 1 in such manner that its circular interior surface 24 is disposed on a cylindrical surface 25 at the end of the hub 1. The web 23 may be securely held in position by a plurality of through bolts 26 and the rubber plates 5 vulcanized to the adjacent metal surfaces as hereinbefore explained.

In the modification of the invention, shown in Fig. 7, the web members to which the rubber plates 5 are vulcanized are formed separately from the hub and the rim in such manner that the wheel may be readily dismounted in the event that it becomes desirable to renew either the rim or the resilient assembly or the hub member. As shown, the rim 3 is carried on a continuous annular felly 11 that is provided with an integral inwardly extending web member 9. The web member 9 is disposed between two removable annular web members 27 and 28 which engage each other at the bottom of the groove formed between them and are both carried on the cylindrical surface 25 at the end of the hub 1. Rubber plates 5 are disposed at each side of the web 9 in the same manner that they are mounted in the wheel shown in Fig. 6. However, in this modification of the invention, it is apparent that the web member 9 on the felly 11 and the webs 27 and 28, taken separately, may be vulcanized to the plates 5 to constitute a unitary resilient structure. After being vulcanized the webs 27 and 28 may be mounted on the cylindrical surface 25 of the hub 1 and securely held in place by bolts 26. The rim 3 may then be mounted on the periphery of the felly 11 and similarly secured by suitable bolts 17.

In Figs. 8, 9 and 10 I have shown a preferred embodiment of my invention in a form which may be applied to the wheels of a street railway car. In this embodiment of the invention the resilient wheel is constructed, in general, similar to the wheel shown in Fig. 7 in that the hub, the rim and the resilient element are each made separately and the wheel may be taken apart to permit repair of renewal of any part. As shown, the hub portion 1 is provided with a cylindrical periphery 25 and an integral annular flange or web 31 that extends outwardly along the inside of the wheel. Likewise the rim 3 has a cylindrical interior surface 32 and an inwardly extending annular flange 33 that is disposed at the outside of the wheel in spaced relation with the flange 31 on the hub 1.

Between the cylindrical surfaces 25 and 32 is disposed an annular resilient assembly or web member 34. As shown, the resilient member 34 is held on the hub 1 by the flange 31 at one side and by an annular retaining ring 35 at the other side. The flange 33 on the rim likewise engages one side of the resilient member, the side opposite from that engaged by the flange 31, and the rim is held in position by a second annular retaining ring 36 that engages the other side of the resilient member.

To transmit torque from the hub 1 to the resilient member 34 and to hold the retaining ring 35 in position, a plurality of bolts 37 are provided which are disposed in a circle and extend through suitable holes in the flange 31, through a portion of the resilient member 34 and through the retaining ring 35. Similar bolts 38 also disposed in a circle, extend through holes in the flange 33 on the rim 3 for transmitting torque from the resilient element 34 to the rim 3. These bolts pass through another portion of the resilient element 34 and the retaining ring 36 and function to hold the resilient element securely within the rim 3. The bolts 37 and 38 are each provided with suitable nuts 39 for drawing them tight.

By providing the flange 31 on the inside of the wheel and the flange 33 on the outside of the wheel the thrust forces which may be exerted inwardly upon the wheel flange 4 will exert compression force upon the resilient element 34. Such forces as may be exerted in the opposite direction will be of small magnitude and can readily be resisted by the retaining rings 35 and 36 and the bolts 37 and 38.

The resilient element 34 that is utilized in this embodiment of my invention comprises a plurality of flat steel plates or webs 41 and 42 of annular shape, stacked alternately with annular plates 5 of rubber. As shown, the plates 41 are of larger outer diameter than the plates 42 and the rubber plates 5, and are provided near their outer edges with holes 43 for receiving the bolts 38. The plates 42, which are disposed alternately with the plates 41, are of smaller inner diameter than the plates 41 and are provided with holes 44 suitably placed to receive the bolts 37. On the sides the resilient element is provided with steel plates 45 and 46 that are somewhat heavier than the plates 41 and 42 to which they correspond respectively. These plates reinforce the structure and engage the sides of the flanges 33 and 31. Also the retaining rings 35 and 36 overlap the edges of the plates 45 and 46 to prevent the rim from coming off in the event of failure of the resilient element. However, a slight clearance space is provided between the plates 45 and 46 and the retaining rings 35 and 36 respectively to permit resilient deflection of the wheel in the axial direction.

Clearance notches 47 and 48 are provided in the plates 41 and 42 respectively at the sides opposite the holes 43 and 44 for bolts to permit each plate to move relative to the bolts which hold the plates adjacent to it.

It is apparent that the resilient element 34 may be readily assembled and vulcanized in a suitable mold to constitute a solid unitary structure of closely united steel and rubber.

To initially stress the rubber in the plates 5 in such manner that it will be somewhat more resistant to loads of low values, means are provided for holding the plates 41 and 42 apart to apply tension stresses to the rubber. The means for accomplishing this result comprise wedge shaped elements or spacers 51 and 52 that are disposed between the extending portions of the plates 41 and 42 respectively. The wedges 51 and 52 may be annular rings or may be segments of an annulus cut to suitable lengths. They are made sufficiently wide to spread the pairs of plates 41 and 42 the distance necessary to set up desired initial tension in the rubber.

As shown in Fig. 8, the retaining rings 35 and 36 engage the inner and outer edges respectively of plates 42 and 41 and clamp between each pair of plates one of the wedges 52 or 51 thereby holding the entire resilient assembly 34 in rigid connection with the hub I and the rim 3. In thickness or depth each wedge 51 or 52 is so proportioned that it does not touch the top of the plate between the pair spread by it, thereby providing a suitable clearance space to permit relative motion between the intermediate plate and the wedge.

It may be found to be desirable, in some cases to place the rubber plates 5 in compression initially instead of in tension. In such cases the wedge pieces 51 and 52 may be made somewhat narrower than the normal spaces between the pairs of plates 41 and 42. When the bolts 37 and 38 are drawn tight the pairs of plates 42 and 41 will be forced into engagement with the wedges 52 and 51 by the retaining rings 35 and 36 thereby compressing the rubber plates 5.

To prevent heat from being transferred from the working surface 4 of the rim 3 to the resilient element 34, large open spaces are provided between a plurality of relatively short spokes 54. The spokes 54 are disposed between the outer portion of the rim, which has the working surface 4, and the inner portion of the rim that is provided with the cylindrical web engaging surface 32. As shown in Figs. 9 and 10, the spokes 54 are set at an angle inclined to the axis of the wheel to constitute fan blades for increasing the circulation of air through the spaces between them.

From the foregoing description of typical wheel structures embodying my invention, it is apparent that I have provided a resilient wheel for railway and other vehicles that is durable, that may be readily manufactured and that is substantially noiseless in operation.

Although I have shown several modifications of the invention, it will be apparent to others skilled in the art that the resilient wheel may be constructed in other ways without departing from the spirit and scope of my invention as defined in the appended claims.

I claim:

1. In a resilient wheel, a center member having outwardly extending webs, a felly having inwardly extending webs disposed between adjacent webs on the center, said felly being constructed in a plurality of segments to permit assembling it on the center, a rim in engagement with the periphery of the felly, and annular rubber plates disposed between the webs on the center and the webs on the felly and vulcanized to each for transmitting torque and radial forces therebetween.

2. In a resilient wheel, in combination, a central member provided with spaced integral web elements, an outer annular member having segmental web elements extending into the spaces between the web elements of said central member, and annular plates of rubber disposed between the web elements on the central member and the web elements on the outer member and securely jointed to each by a vulcanized joint to constitute a resilient force transmitting connection between the center member and the outer member.

3. In a resilient wheel, the combination with a hub member provided with integral outwardly extending spaced apart web elements having plane faces, and a rim member provided with segmental annular web elements having plane faces and extending inwardly into the spaces between the web elements of the hub member, of annular rubber plates between the plane faces of the webs on the hub and the plane faces of the webs on the rim and disposed concentrically of the wheel axis, said rubber plates being perforated to allow distortion of the rubber and being vulcanized to the faces of the web members to resiliently couple the hub member to the rim member.

4. A resilient wheel comprising a hub portion having an outwardly extending web, a rim portion having an inwardly extending web disposed adjacent to and parallel with the web on the hub, a plate of rubber having spaced holes disposed between the web on the hub and the web on the rim and adhesively secured to each, said holes being disposed parallel to the axis of the wheel and functioning to permit the rubber to deform when stressed, and means for interlocking said hub and rim against excessive circumferential displacement, said interlocking means permitting of a limited amount of radial displacement between said hub and rim portions.

5. A resilient wheel comprising a hub, a rim carried by the hub, a resilient element interposed between the hub and the rim, said resilient element comprising a plurality of annular steel plates and annular plates of rubber stacked alternately and adhesively secured together, and means connecting alternate steel plates to the hub and to the rim respectively.

6. A resilient wheel comprising a hub, a rim carried by the hub, a resilient element interposed between the hub and the rim, said resilient element comprising a plurality of annular steel plates and annular plates of rubber stacked alternately and adhesively secured together, means connecting alternate steel plates to the hub and to the rim respectively, spacing members between the steel plates, and means for gripping the steel plates and spacing members to set up predetermined initial stress in the rubber plates.

7. A resilient wheel comprising a hub, a rim carried by the hub, a resilient element interposed between the hub and the rim, said resilient element comprising a plurality of steel plates and plates of rubber stacked alternately and adhesively secured together, and means connecting alternate steel plates to the hub and to the rim respectively.

HARRY M. PATCH.